United States Patent
Kawamura

(10) Patent No.: US 7,909,016 B2
(45) Date of Patent: Mar. 22, 2011

(54) VALVE TIMING CONTROL APPARATUS FOR INTERNAL COMBUSTION ENGINE

(75) Inventor: Hideki Kawamura, Chita-gun (JP)

(73) Assignee: Denso Corporation, Kariya (JP)

( * ) Notice: Subject to any disclaimer, the term of this patent is extended or adjusted under 35 U.S.C. 154(b) by 114 days.

(21) Appl. No.: 12/497,763

(22) Filed: Jul. 6, 2009

(65) Prior Publication Data
US 2010/0023242 A1   Jan. 28, 2010

(30) Foreign Application Priority Data
Jul. 22, 2008  (JP) ................. 2008-189214

(51) Int. Cl.
*F02D 13/04*   (2006.01)
(52) U.S. Cl. .............. 123/321; 123/322; 123/90.14
(58) Field of Classification Search .......... 123/321, 123/322, 345–348, 90.1, 90.12, 90.14–90.19
See application file for complete search history.

(56) References Cited

U.S. PATENT DOCUMENTS

| | | | |
|---|---|---|---|
| 6,705,256 B2 * | 3/2004 | Yamaki et al. | 123/90.11 |
| 6,880,504 B2 * | 4/2005 | Takahashi | 123/90.15 |
| 7,505,845 B2 * | 3/2009 | Yasuda et al. | 701/103 |

FOREIGN PATENT DOCUMENTS
JP   11-36905   2/1999
* cited by examiner

*Primary Examiner* — John T Kwon
(74) *Attorney, Agent, or Firm* — Nixon & Vanderhye PC

(57) ABSTRACT

A valve timing control apparatus for an internal combustion engine includes a variable valve timing mechanism. The valve timing control apparatus sets target valve timing based on an operational state of the engine. The valve timing control apparatus detects actual valve timing. The valve timing control apparatus computes a control amount based on a deviation between the target valve timing and the actual valve timing, and based on a hold control amount. The valve timing control apparatus determines whether a learning execution condition for executing a learning operation of the hold control amount is satisfied based on a change direction of the detected actual valve timing. The valve timing control apparatus executes the learning operation when the learning execution condition is satisfied.

6 Claims, 7 Drawing Sheets

CONVENTIONAL TECHNIQUE

ADVANCE AMOUNT

TARGET ADVANCE AMOUNT
ACTUAL ADVANCE AMOUNT

CONVENTIONAL TECHNIQUE

HOLD DUTY VALUE A

CONVENTIONAL TECHNIQUE

FEED-BACK CORRECTION AMOUNT B

CONVENTIONAL TECHNIQUE

CONTROL DUTY VALUE A + B

VALVE TIMING CONTROL APPARATUS FOR INTERNAL COMBUSTION ENGINE

CROSS REFERENCE TO RELATED APPLICATION

This application is based on and incorporates herein by reference Japanese Patent Application No. 2008-189214 filed on Jul. 22, 2008.

BACKGROUND OF THE INVENTION

1. Field of the Invention

The present invention relates to a valve timing control apparatus for an internal combustion engine, the valve timing control apparatus being capable of learning a hold control amount that is used for maintaining actual valve timing at a present state.

2. Description of Related Art

A variable valve timing control apparatus is known to change opening and closing timing (valve timing) of at least one of intake and exhaust valves of an internal combustion engine (engine) in accordance with the operational state of the engine. In general, in a hydraulic variable valve timing control apparatus that uses oil pressure as a drive source, a hydraulic control valve (OCV) is controlled based on a duty cycle such that pressure of oil supplied to a variable valve timing mechanism is adjusted. As a result, a rotational phase difference between a crankshaft and a camshaft of the engine is changed, and thereby valve timing is changed accordingly.

More specifically, the hydraulic control valve is controlled based on a control duty value that is computed based on a hold duty value (hold control amount) and a deviation between target valve timing and actual valve timing. The above target valve timing is typically computed based on an operational state of the engine. The hold duty value is defined as a duty value (duty cycle) measured when a speed of change of the valve timing is zero, and thereby a hold duty value indicates the duty value that is used for holding or maintaining present valve timing.

In general, the hold duty value changes with variations in the manufacturing tolerances or the aged deterioration of a variable valve timing mechanism or a hydraulic control valve, with an oil temperature, or with an engine rotation speed. When the hold duty value changes, it is impossible to accurately control the actual valve timing, and thereby the accuracy of the variable valve timing control may deteriorate. Thus, there is needed to learn the hold duty value in accordance with the state of the engine as required. For example, JP-A-H11-36905 describes a technique, in which a control duty value is learned as the hold duty value when the following conditions are satisfied. The deviation between the target valve timing and the actual valve timing is equal to or greater than a predetermined value, and both the target valve timing and the actual valve timing have not changed for a predetermined time period.

Because a learning execution condition for executing the learning operation includes that both the target valve timing and the actual valve timing have not changed for the predetermined time period in JP-A-H11-36905 as above, it may require more time for the actual valve timing to become the target valve timing when a responsivity of the variable valve timing mechanism deteriorates for some reasons, for example. As a result, the satisfaction of the learning execution condition may be delayed, and thereby an unwanted deviation between the actual valve timing and the target valve timing may cause an insufficient torque generation disadvantageously during a period before the learning execution condition becomes satisfied. Furthermore, when the satisfaction of the learning execution condition is delayed, the frequency of satisfying the learning execution condition becomes reduced accordingly. As a result, the frequency of learning of the hold duty value may be reduced, and thereby the accuracy in the learning of the hold duty value may deteriorate disadvantageously.

SUMMARY OF THE INVENTION

The present invention is made in view of the above disadvantages. Thus, it is an objective of the present invention to address at least one of the above disadvantages.

To achieve the objective of the present invention, there is provided a valve timing control apparatus for an internal combustion engine, the valve timing control apparatus including a variable valve timing mechanism. The variable valve timing mechanism changes valve timing of at least one of an intake valve and an exhaust valve of the internal combustion engine, and the variable valve timing mechanism is driven based on oil pressure. The valve timing control apparatus controls the oil pressure that drives the variable valve timing mechanism. The valve timing control apparatus sets target valve timing based on an operational state of the internal combustion engine. The valve timing control apparatus detects actual valve timing. The valve timing control apparatus computes a control amount. The valve timing control apparatus computes the control amount based on a deviation, which is defined between the target valve timing and the actual valve timing, and based on a hold control amount, which is used for maintaining the actual valve timing at a present state. The valve timing control apparatus controls the oil pressure based on the computed control amount such that the actual valve timing becomes the target valve timing. The valve timing control apparatus executes a learning operation for learning the hold control amount. The valve timing control apparatus determines whether a learning execution condition for executing the learning operation is satisfied based on a change direction of the detected actual valve timing. The valve timing control apparatus executes the learning operation for learning the hold control amount when the valve timing control apparatus determines that the learning execution condition is satisfied.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF EMBODIMENT

One embodiment of the present invention will be described below with reference to accompanying drawings. The one embodiment is applied to an intake-side variable valve timing control apparatus that controls valve timing of an intake valve.

A configuration of the intake-side variable valve timing control apparatus will be described with reference to FIGS. 1 to 5.

Figure 1:
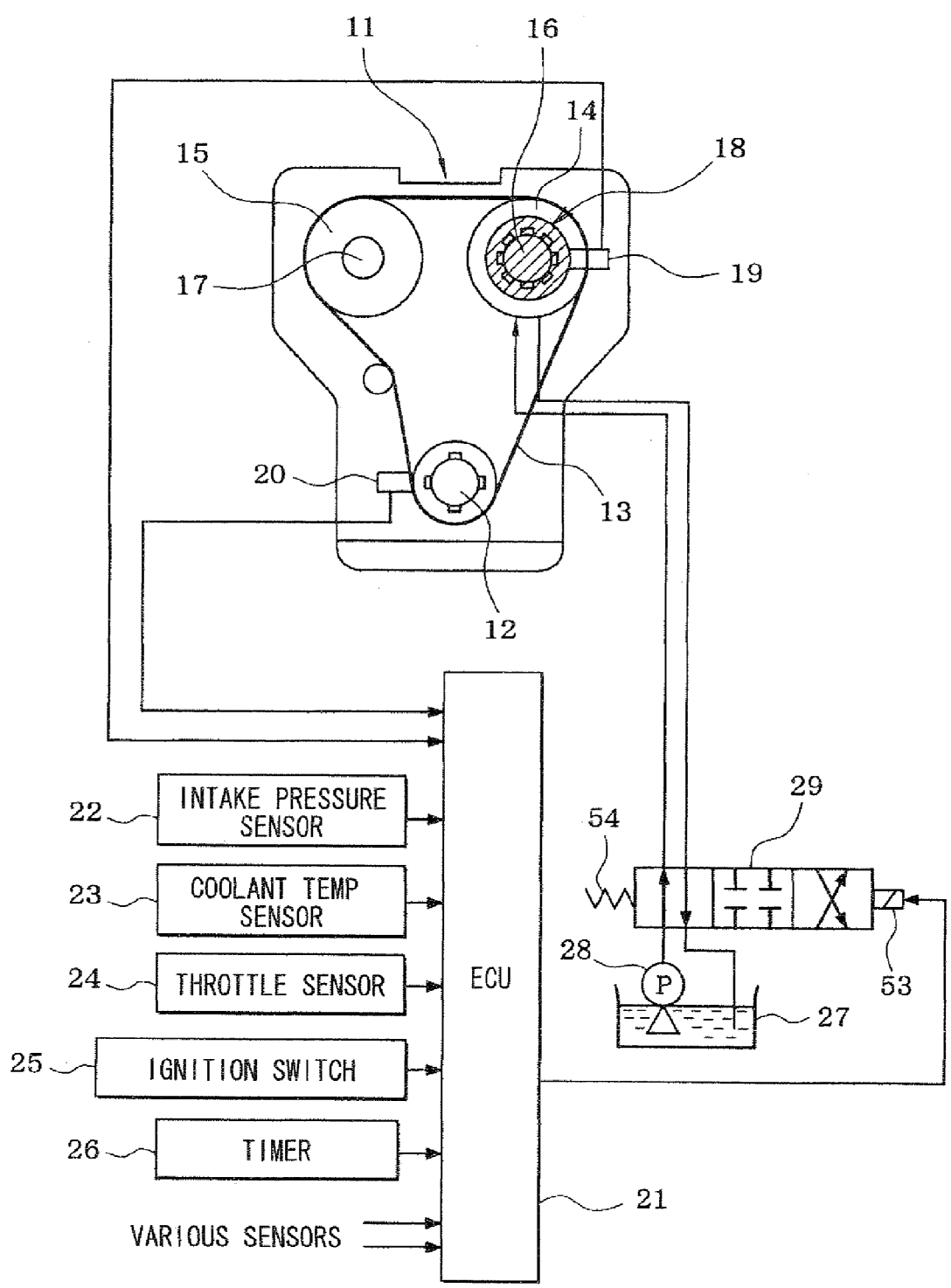
FIG. 1 is a diagram illustrating a general schematic configuration of a control system according to one embodiment of the present invention.

As shown in FIG. 1, an engine 11 serving as an "internal combustion engine" includes a crankshaft 12, a timing chain 13, sprockets 14, 15, an intake-side camshaft 16, and an exhaust-side camshaft 17. The timing chain 13 transmits a drive force from the crankshaft 12 to the intake-side camshaft 16 and the exhaust-side camshaft 17 through each of the sprockets 14, 15. The intake-side camshaft 16 is provided with a variable valve timing mechanism 18 that is configured to adjust an advance amount of the intake-side camshaft 16 relative to the crankshaft 12.

Also, a cam angle sensor 19 is provided at a position radially outward of the intake-side camshaft 16, and a crank angle sensor 20 is provided at a position radially outward of the crankshaft 12. The crank angle sensor 20 output pulses of crank angle signals for predetermined crank angles.

Figure 2:
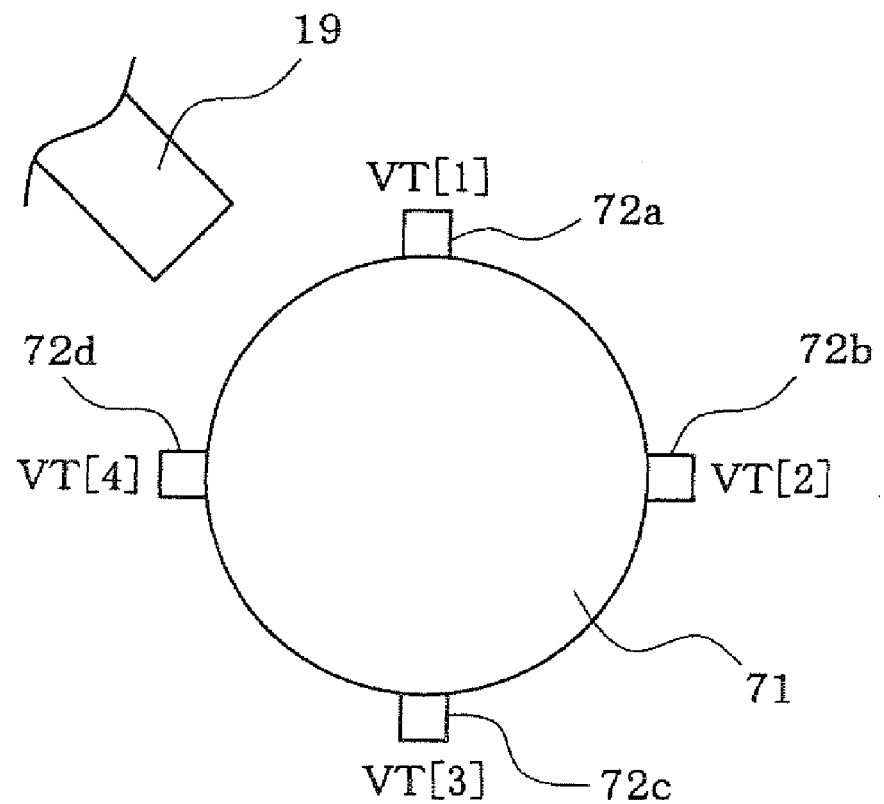
FIG. 2 is a diagram for explaining a structure of a cam angle sensor.

As shown in FIG. 2, the cam angle sensor 19 is provided at a position radially outward of a signal rotor 71 of the camshaft 16 such that the cam angle sensor 19 is opposed to the signal rotor 71. For example, the signal rotor 71 has four projections 72a to 72d at the outer periphery of the signal rotor 71. The projections 72a to 72d are arranged at intervals of 90°. The cam angle signal is outputted at every 180° CA with a rotation of the signal rotor 71 (the intake-side camshaft 16). Thus, the cam angle is indicated by the cam angle signal outputted by the cam angle sensor 19. Due to the above configuration, it is possible to identify a crank angle and a cylinder of interest by counting the pulses of the crank angle signal outputted by the crank angle sensor 20 based on the cam angle.

The output signals from the cam angle sensor 19 and the crank angle sensor 20 are inputted into an engine control circuit (ECU) 21. The ECU 21 computes actual valve timing of the intake valve, and computes an engine rotation speed based on a frequency (pulse interval) of the pulses outputted by the crank angle sensor 20. Also, the ECU 21 receives output signals from various sensors that detects the operational state of the engine, such as an intake pressure sensor 22, a coolant temperature sensor 23, a throttle sensor 24, and also receives signals outputted from an ignition switch 25 and a timer 26.

The ECU 21 executes a fuel injection control and an ignition control based on the various input signals, and executes a variable valve timing control, in which oil pressure that drives the variable valve timing mechanism 18 is feed-back controlled such that the actual valve timing of the intake valve becomes target valve timing. In the above control, the actual valve timing corresponds to an actual advance amount of the intake-side camshaft 16, and the target valve timing corresponds to a target advance amount of the intake-side camshaft 16. The variable valve timing mechanism 18 has an oil pressure circuit that receives oil supplied by an oil pump 28 from an oil pan 27 through a hydraulic control valve 29. The variable valve timing mechanism 18 controls the oil pressure by the hydraulic control valve 29 in order to control the actual advance amount (actual valve timing) of the intake-side camshaft 16.

Next, a configuration of the variable valve timing mechanism 18 will be described with reference to FIG. 3. The variable valve timing mechanism 18 has a housing 31 that is fastened to the sprocket 14 through a bolt 32, and the sprocket 14 is supported rotatably about the intake-side camshaft 16. Due to the above configuration, rotation of the crankshaft 12 is transmitted to the sprocket 14 and the housing 31 through the Liming chain 13, and thereby the sprocket 14 and the housing 31 are rotated synchronously with the crankshaft 12.

In contrast, the intake-side camshaft 16 is rotatably supported by a cylinder head 33 and a bearing cap 34, and the intake-side camshaft 16 has one end portion that is fastened to a rotor 35 by a bolt 37. A stopper 36 is provided between the rotor 35 and the bolt 37. The rotor 35 is received within the housing 31 in a manner that the rotor 35 is rotatable relative to the housing 31. The rotor 35 has vanes 41 that are provided at positions radially outward of the rotor 35.

Figure 4:
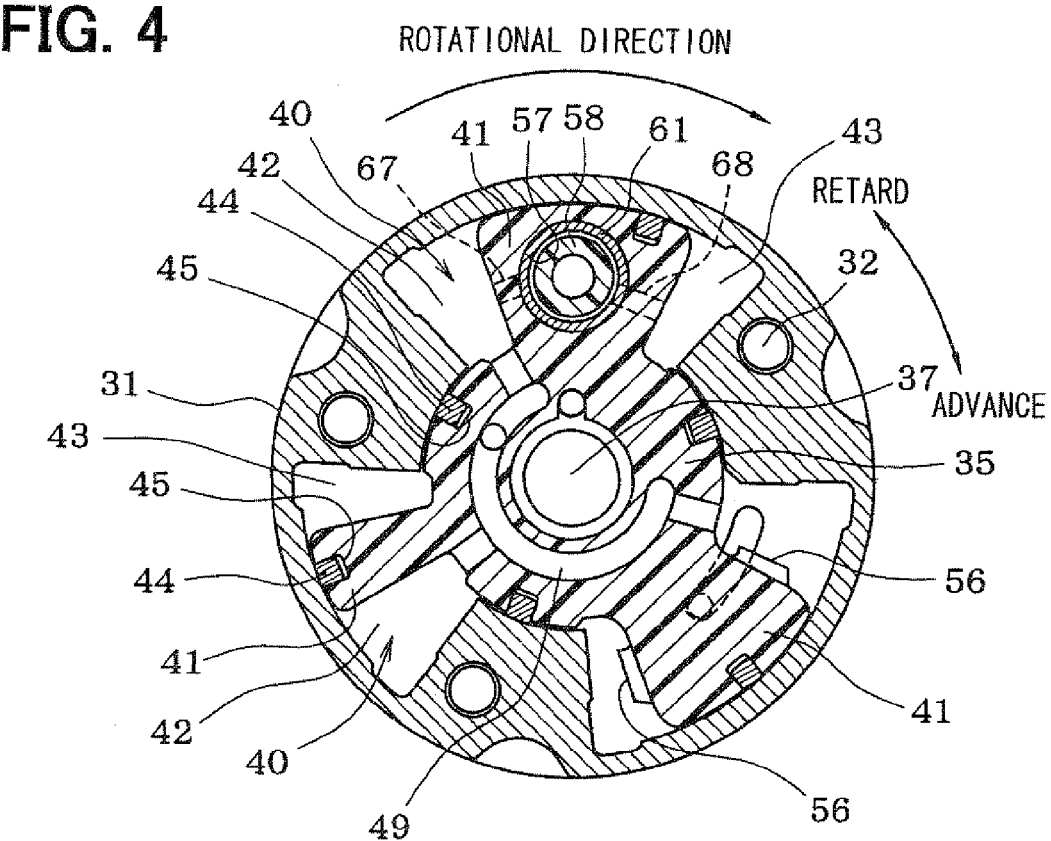
FIG. 4 is a cross-sectional view taken along lines IV-IV of FIG. 3.
Figure 5:
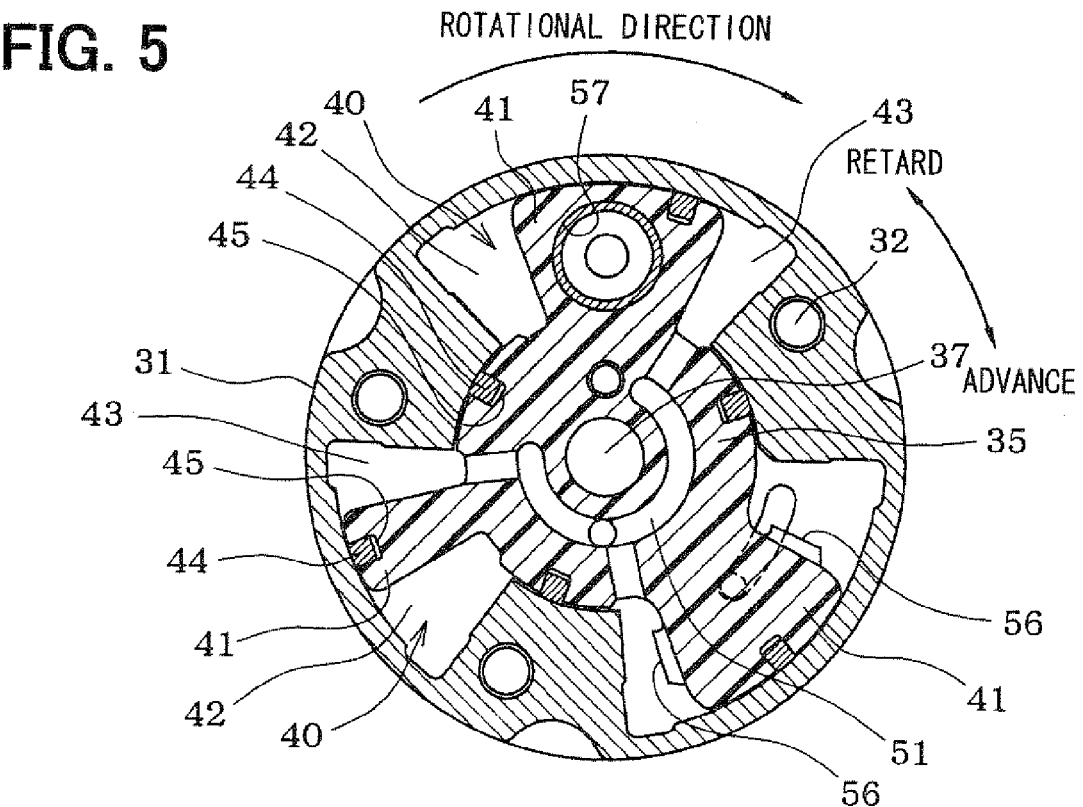
FIG. 5 is a cross-sectional view taken along lines V-V of FIG. 3.

As shown in FIG. 4 and FIG. 5, the housing 31 defines therein multiple fluid chambers 40, and each of the fluid chambers 40 is divided by the corresponding vane 41 of the rotor 35 into an advance chamber 42 and a retard chamber 43. Then, the rotor 35 has radially outer parts that are provided with corresponding seal members 44, and each vane 41 has a radially outer part that is also provided with a corresponding seal member 44. Each of the seal members 44 is provided with a leaf spring 45, and the leaf spring 45 biases the seal member 44 in a radially outer direction. Thus, the seal member 44 is capable of sealing a clearance between an outer peripheral surface of the rotor 35 and an inner peripheral surface of the housing 31, and also is capable of sealing a clearance between an outer peripheral surface of the vane 41 and an inner peripheral surface of the fluid chamber 40.

Figure 3:
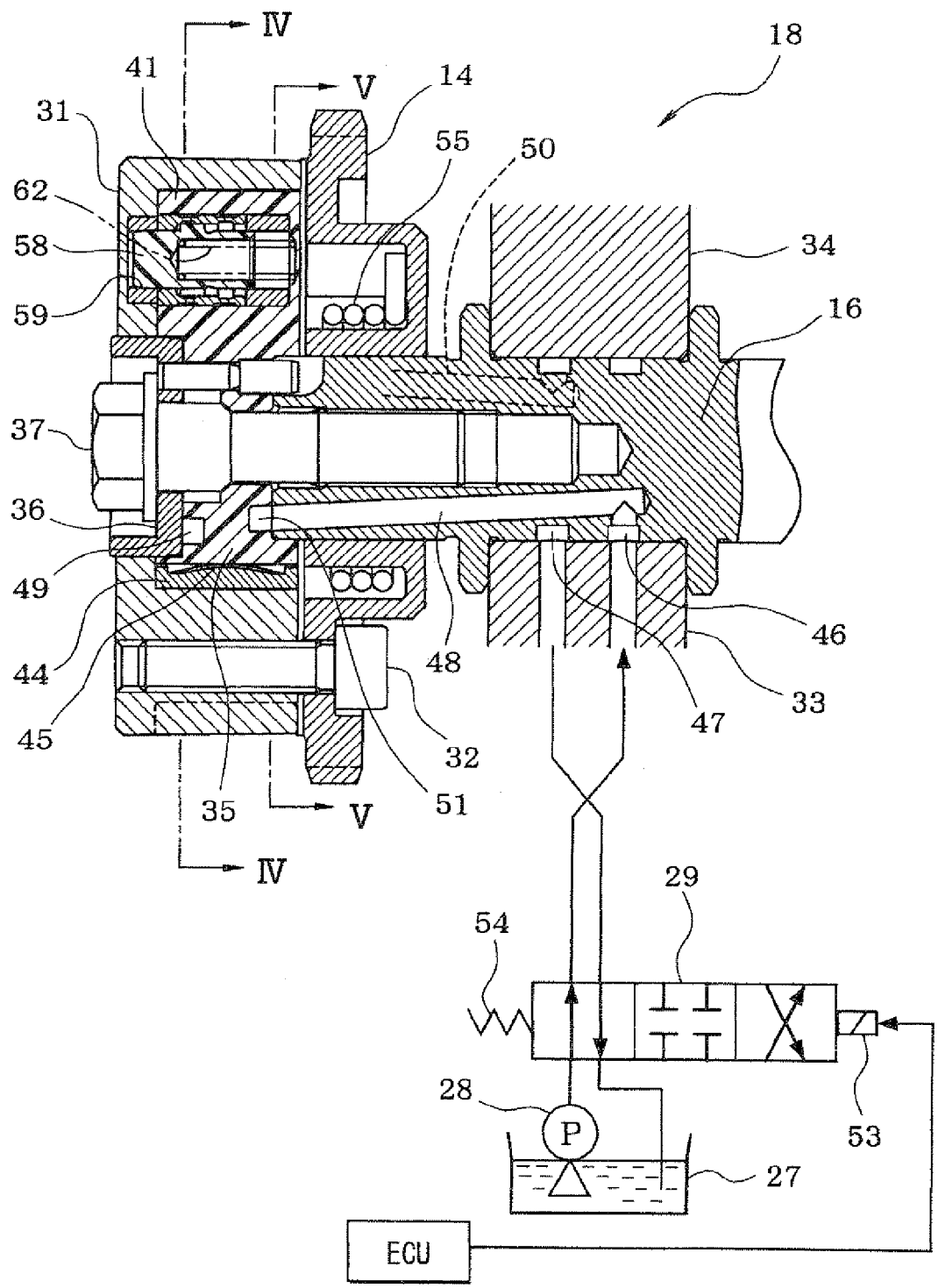
FIG. 3 is a longitudinal sectional view of a valve timing control apparatus.

As shown in FIG. 3, an annular advance groove 46 and an annular retard groove 47 are defined at a radially outer part of the intake-side camshaft 16, and each of the grooves 46, 47 is connected with a predetermined port of the hydraulic control valve 29. The oil pump 28 is driven by a drive force of the engine 11 such that oil pumped by the oil pan 27 is supplied to the advance groove 46 and the retard groove 47 through the hydraulic control valve 29. The advance groove 46 is connected with an advance oil passage 48 that extends through the intake-side camshaft 16 to communicate with an arcuate advance oil passage 49 that is formed at one end surface (left surface in FIG. 3) of the rotor 35. The arcuate advance oil passage 49 is also shown in FIG. 4. The arcuate advance oil passage 49 is communicated with each of the advance chambers 42. In contrast, the retard groove 47 is connected with a retard oil passage 50 that extends through the intake-side camshaft 16 to communicate with an arcuate retard oil passage 51 formed at the other end surface (right surface in FIG. 3) of the rotor 35. The retard oil passage 50 is also shown in FIG. 5. The arcuate retard oil passage 51 is communicated with each of the retard chambers 43.

In a state, where the advance chamber 42 and the retard chamber 43 are supplied with oil under a pressure equal to or greater than a predetermined pressure, oil pressures in the advance chamber 42 and the retard chamber 43 fix the vane 41 such that rotation of the housing 31 caused by the rotation of the crankshaft 12 is transmitted to the rotor 35 (the vane 41) through oil. As a result, the intake-side camshaft 16 is rotated integrally with the rotor 35. During the operation of the engine, the hydraulic control valve 29 controls the oil pressures in the advance chamber 42 and in the retard chamber 43 such that the housing 31 is rotated relative to the rotor 35 or the vane 41. As a result, a rotational phase (or a camshaft phase) of the intake-side camshaft 16 relative to the crankshaft 12 is controlled in order to change valve timing of the intake valve. It should be noted that the sprocket 14 receives therein a helical torsion spring 55 (see FIG. 3) that generates a spring force in a direction such that the spring force of the spring 55 assists oil pressure to relatively rotate the rotor 35 in an advance direction during an advance control.

Also, as shown in FIG. 4 and FIG. 5, stoppers 56 are provided to both circumferential ends of one of the vanes 41, and the stoppers 56 limit a rotational range, in which the rotor 35 (the vane 41) is rotatable relative to the housing 31. The stoppers 56 regulates a full retard phase and a full advance phase of the camshaft phase. Further more, a lock pin receiving hole 57 is formed on the vane 41, and the lock pin receiving hole 57 receives a lock pin 58 that is used to lock the relative rotation of the housing 31 relative to the rotor 35 (the vane 41). When the lock pin 58 is fitted into a lock hole 59 provided at the housing 31 (see FIG. 3), a change angle of the camshaft is locked to a predetermined lock position. The lock position is, for example, a position that is suitable for starting the engine, and may correspond to the full retard position.

During the operation of the engine, the ECU 21 functions as "actual valve timing detection means" for computing actual valve timing VT of the intake valve (an actual advance position of the intake-side camshaft 16) based on the signals outputted from the crank angle sensor 20 and the cam angle sensor 19. Also, the ECU 21 functions as "target valve timing setting means" for computing target valve timing VTT of the intake valve (a target advance position of the intake-side camshaft 16) based on the signals outputted from the various sensors, such as the intake pressure sensor 22, the coolant temperature sensor 23, which detect the operational state of the engine. Then, the ECU 21 computes a feed-back correction amount based on a deviation between the target valve timing VTT and the actual valve timing VT such that the actual valve timing VT of the intake valve becomes the target valve timing VTT. When a learning execution condition, which is described later, is satisfied, the ECU 21 learns a hold duty value that is used for maintaining the actual valve timing VT at a present state or at present timing, and obtains a control duty value by adding a feed-back correction amount to the hold duty value. Then, the ECU 21 feed-back controls the hydraulic control valve 29 based on the control duty value. As above, the ECU 21 functions as "control amount computing means" and "oil pressure control means". Thus, by feed-back controlling the hydraulic control valve 29, the oil pressures in the advance chamber 42 and in the retard chamber 43 are controlled such that the housing 31 is rotated relative to the rotor 35, As a result, the camshaft phase is changed, and thereby the actual valve timing VT of the intake valve becomes the target valve timing VTT. In the present embodiment, the hold duty value serves as a "hold control amount", and the control duty value serves as a "control amount".

Then, when the engine 11 is stopped, the discharge pressure of the oil pump 28 is decreased with a decrease of the engine rotational speed. As a result, oil pressures in the advance chamber 42 and in the retard chamber 43 are decreased. Thus, oil pressure in an oil pressure chamber 65 (oil pressure in the advance chamber 42), which is used to maintain an unlock state, and oil pressure in the lock hole 59 (oil pressure in the retard chamber 43) are reduced, and thereby a spring force generated by a spring 62 exceeds oil pressures of the above chamber 65 and the hole 59. As a result, the spring force of the spring 62 causes the lock pin 58 to move to be fitted into the lock hole 59. Note that in order to make the lock pin 58 fitted into the lock hole 59, the lock pin 58 is required to be aligned with the lock hole 59. In other words, the camshaft phase is required to be a phase such that the lock pin 58 is positioned to be fittable into the lock hole 59.

When the engine 11 is stopped, the engine rotational speed (a rotational speed of the oil pump 28) is decreased, and thereby oil pressure is decreased. Thus, load torque of the camshaft 16 naturally changes the camshaft phase in a retard direction, and eventually the lock pin 58 is fitted into the lock hole 59 such that the camshaft phase is locked to the lock position as shown in FIGS. 4 and 5.

As described above, by controlling the hydraulic control valve 29 based on the control duty value or the control amount, the actual advance amount of the intake-side camshaft 16 or the actual valve timing is controlled. The control duty value for the hydraulic control valve 29 is computed based on the hold duty value and the feed-back correction amount that is computed based on the deviation between the target valve timing and the actual valve timing. The hold duty value is a duty value that sets a speed of change of the valve timing (advance speed) at 0. In other words, the hold duty value is used to maintain the present valve timing.

The hold duty value varies with the difference in the oil temperature or the engine rotation speed. Also, the hold duty value varies with the manufacturing tolerances or the aged deterioration of the variable valve timing mechanism 18 and the hydraulic control valve 29. As a result, if the hold duty value changes, it may become impossible to accurately control the actual valve timing, and thereby the accuracy in the variable valve timing control may deteriorate in a conventional technique. In order to deal with the above disadvantage, there is a need to learn the hold duty value at times as required in accordance with the state of the engine. In one example of a conventional method for learning the hold duty value, a control duty value of a certain operational state is learned as the hold duty value. The certain operational state is required to simultaneously satisfy the following two learning execution conditions. In one condition, the deviation between the target valve timing and the actual valve timing is equal to or greater than a predetermined value. In the other condition, both the target valve timing and the actual valve timing have not changed for a predetermined time period.

However, in the above conventional method, one of the learning execution conditions is satisfied only when the target valve timing and the actual valve timing have not changed for the predetermined time period. As a result, in a case, where responsivity of the variable valve timing mechanism 18 deteriorates due to some reasons, for example, it takes more time for the actual valve timing to become the target valve timing, and thereby it takes more time to satisfy the learning execution condition. Thus, before satisfying the learning execution condition, unwanted deviation between the actual valve timing and the target valve timing may only generate an insufficient torque disadvantageously in the conventional method.

Figure 6A:
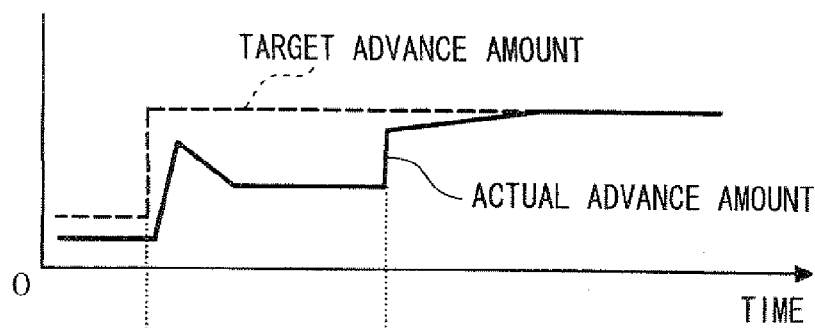
FIGS. 6A to 6D are timing charts for explaining a learning method for learning a hold duty value according to a conventional art.
Figure 6B:
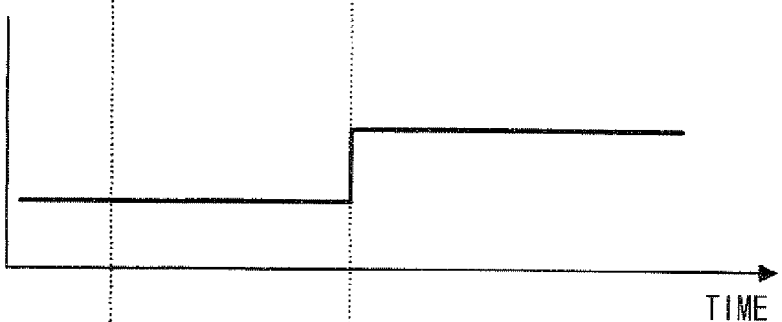
Figure 6C:
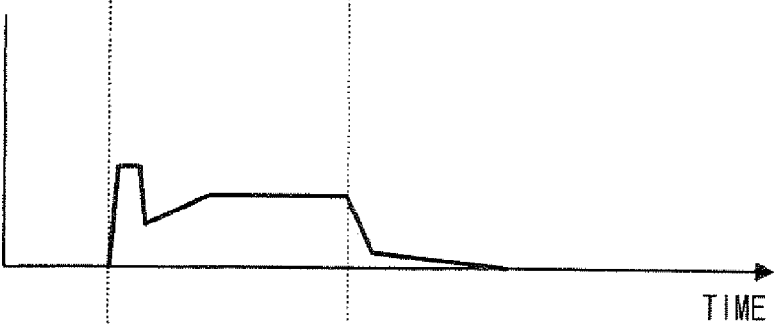
Figure 6D:
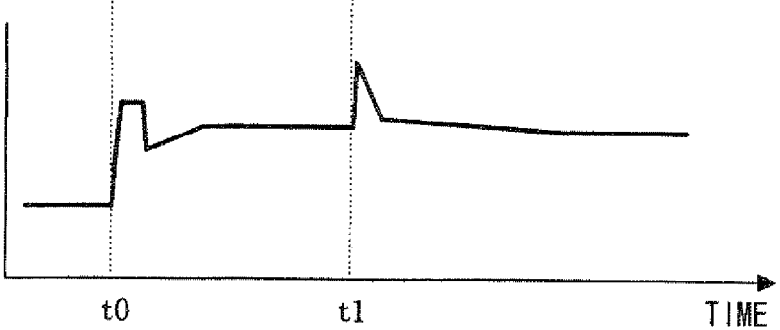

The conventional technique will be described with reference to FIGS. 6A to 6D. FIG. 6A is a timing chart illustrating a behavior of the actual advance amount (actual valve timing) relative to the target advance amount (target valve timing) that changes stepwisely. In FIG. 6A, a solid line indicates the actual advance amount, and a dashed and single-dotted line indicates the target advance amount. FIG. 6B is a timing chart illustrating a behavior of a hold duty value A. FIG. 6C is a timing chart illustrating a behavior of a feed-back correction amount B based on the deviation between the target advance amount and the actual advance amount. FIG. 6D is a timing chart illustrating a behavior of a control duty value (A+B) that is obtained by adding the hold duty value A to the feed-back correction amount B.

As shown in FIG. 6A, when the target advance amount changes stepwise at time of t0, the deviation between the target advance amount and the actual advance amount becomes greater accordingly with the stepwise change. As a result, the feed-back correction amount B that is computed based on the above increased deviation is increased to some extent accordingly as shown in FIG. 6C. However, when the deviation between the actual timing advance amount and the target timing advance amount is reduced as a result, the feed-back correction amount B based on the above deviation decreases accordingly. As a result, the control duty value (A+B) is decreased. In general, when the hold duty value A is set at an appropriate value, the actual advance amount is supposed to be maintained at the target advance amount. In a case, where the hold duty value A erroneously and widely deviates from the appropriate value in the advance direction or in the retard direction when the feed-back correction amount B has decreased as above, the erroneous hold duty value A becomes more influential than the correction amount B on the control duty (A+B). Because the hold duty value A is an erroneous value, the actual timing advance amount may be erroneously advanced or retarded accordingly.

As a result, the deviation between the actual timing advance amount and the target timing advance amount may be enlarged again accordingly. Because the deviation between the actual timing advance amount and the target timing advance amount increases as a result, the feed-back correction amount B based on the deviation also increases. However, the hold duty value is set at the value equivalent to the control duty value (A+B), and thereby the actual timing advance amount may be eventually stabilized at an erroneous amount different from the target timing advance amount.

Even in the above erroneous case, the learning execution condition is satisfied at time t1, by which both the target advance amount and the actual advance amount have not changed substantially for a predetermined time period. As a result, a learning operation for learning the hold duty value A is executed, and the control duty value (A+B) at time t1 becomes a learned value for the hold duty value A. When the hold duty value A is updated as above, the control duty value (A+B) is temporarily and sharply increased, the actual advance amount starts changing toward the target advance amount.

As above, in the conventional art, the learning execution condition will not be satisfied until the target advance amount and the actual advance amount have not changed for the predetermined time period. As a result, the learned value of the hold duty value A will not be updated until the learning execution condition is satisfied next time. Thus, during a period before the learning execution condition is satisfied again, the deviation between the target advance amount and the actual advance amount may be kept at a greater value, and thereby the difference or the unwanted deviation between the actual advance amount and the target advance amount may cause the insufficient torque or deterioration in emission quality disadvantageously. Furthermore, the delay in satisfying the learning execution condition causes the decrease in the frequency of learning the hold duty value A decreases, and thereby the accuracy in learning the hold duty value A may deteriorate.

In order to deal with the above disadvantages of the conventional technique, in the present embodiment, it is determined whether the learning execution condition for learning the hold duty value (hold control amount) is satisfied based on a change direction, in which the actual advance amount changes. Then, when it is determined that the learning execution condition is satisfied, the hold duty value is learned.

Figure 7A:
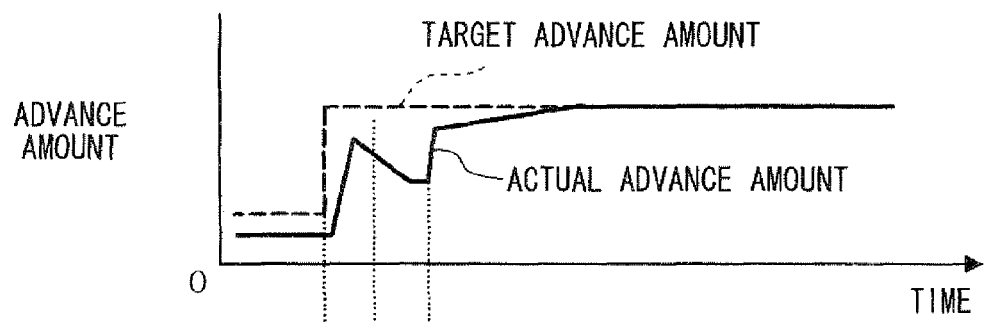
FIGS. 7A to 7D are timing charts for explaining a learning method for learning the hold duty value according to the one embodiment.
Figure 7B:
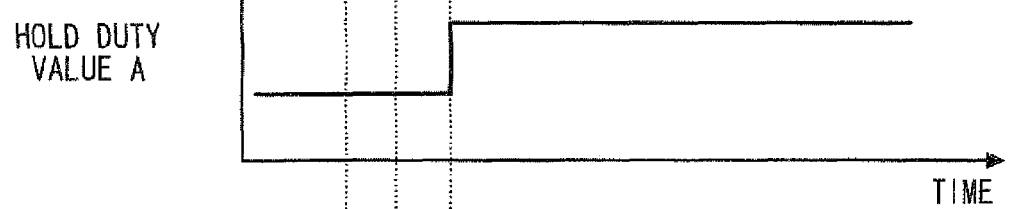
Figure 7C:
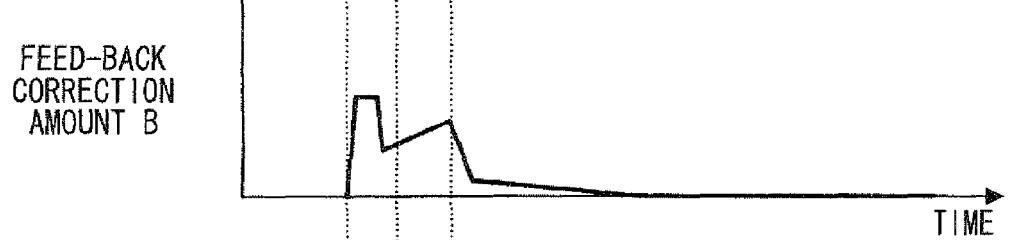
Figure 7D:
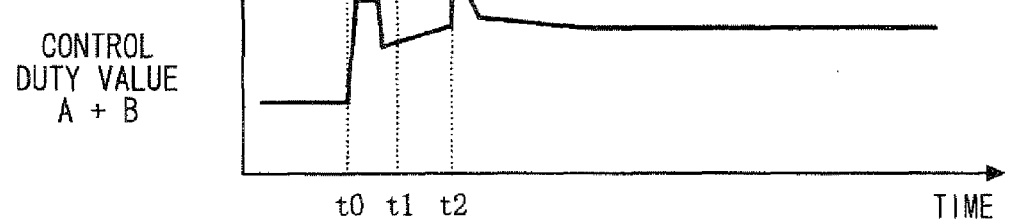

A learning method for learning the hold duty value according to the present embodiment will be described with reference to timing charts shown in FIGS. 7A to 7D. Similar to FIGS. 6A to 6D, FIG. 7A is a timing chart illustrating a behavior of the actual advance amount (actual valve timing) relative to the target advance amount (target valve timing) that changes stepwisely. In FIG. 7A, a solid line indicates the actual advance amount, and a dashed and single-dotted line indicates the target advance amount. FIG. 7B is a timing chart illustrating a behavior of a hold duty value A. FIG. 7C is a timing chart illustrating a behavior of a feed-back correction amount B based on the deviation between the target advance amount and the actual advance amount. FIG. 7D is a timing chart illustrating a behavior of a control duty value (A+B) that is obtained by adding the hold duty value A to the feed-back correction amount B. It should be noted that in the explanation of FIGS. 7A to 7D, parts overlapping with the explanation of FIGS. 6A to 6D will be omitted.

As shown in FIG. 7A, when the target advance amount changes stepwise at time t0, the deviation between the target advance amount and the actual advance amount is increased with the change accordingly. Thus, the feed-back correction amount B computed based on the deviation is increased accordingly as shown in FIG. 7C. The feed-back correction amount B decreases when the deviation between the target advance amount and the actual advance amount becomes smaller around time t1.

In a case, where responsivity the variable valve timing mechanism 18 deteriorates for some reasons, the following phenomenon may be observed in the conventional art. The actual advance amount changes in a direction such that the actual advance amount becomes closer to the target advance amount immediately after the target advance amount is changed. However, the actual advance amount may start changing in the other direction such that actual advance amount deviates from the target advance amount before the actual advance amount reaches the target advance amount. Thus, in the present embodiment, it is monitored whether the actual advance amount changes in an away direction such that the actual advance amount becomes away from the target advance amount. Then, the learning execution condition is determined to be satisfied at time t1, at which it is detected that the change direction of the actual advance amount corresponds to the away direction. As a result, the learning operation of the hold duty value A is executed, and thereby the control duty value (A+B) at time t1 becomes the learned value of the hold duty value A. Thus, when the hold duty value A is updated at time t2, the control duty value (A+B) is temporarily and sharply increased, and the actual advance amount starts quickly changing toward the target advance amount.

As above, in the present embodiment, the hold duty value A is learned at time t1, at which the change direction of the actual advance amount is detected to change in the away direction such that the actual advance amount deviates from the target advance amount. As a result, in contrast to the conventional technique, it is possible to learn the hold duty value A before making sure that the target advance amount and the actual advance amount have not substantially changed for the predetermined time period. Thereby, it is possible to learn the hold duty value A at a relatively earlier time compared with the conventional technique.

Figure 8:
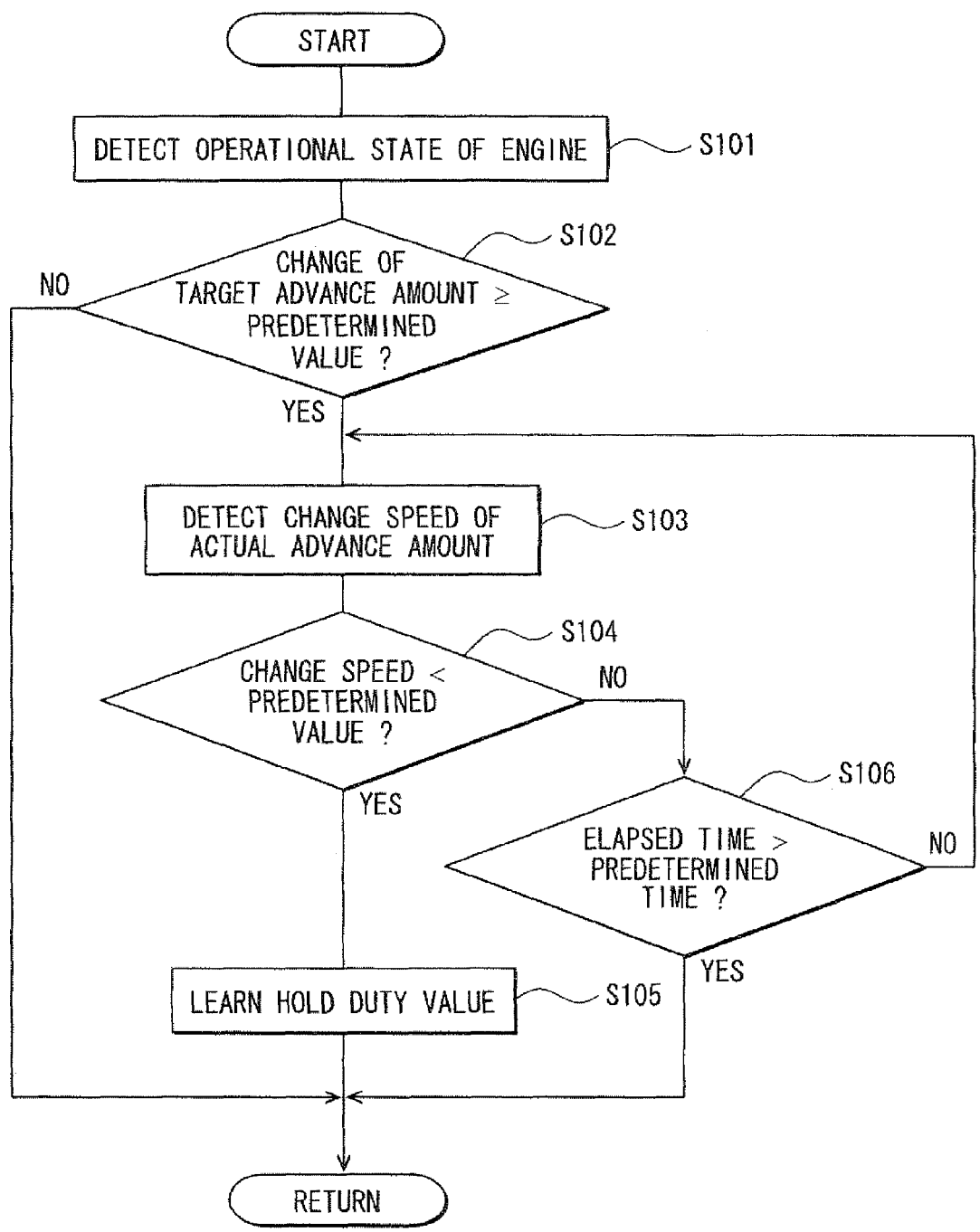
FIG. 8 is a flow chart of a program for learning the hold duty value according to the one embodiment.

FIG. 8 describes a program for learning the hold duty value according to the present embodiment below. The program is executed by the ECU 21 at predetermined time intervals, and the program functions as "learning means".

When the program of FIG. 8 is started, firstly, the operational state of the engine is detected at step S101. The operational state of the engine is detected based on, for example, the signals from various sensors, such as the intake pressure sensor 22, the coolant temperature sensor 23, the throttle sensor 24.

Then, control proceeds to step S102, where it is determined whether the target advance amount changes relatively sharply based on whether a change amount of the target advance amount is equal to or greater than a predetermined value. When the change amount of the target advance amount is less than the predetermined value (or when the target advance amount does not change or changes moderately), there is no need to change the actual advance amount highly responsively, and thereby the present program is ended. It may be determined whether the target advance amount changes relatively sharply alternatively based on whether a difference between the target advance amount and the actual advance amount is equal to or greater than a predetermined value.

In contrast, when it is determined at step S102 that the change amount of the target advance amount is equal to or greater than the predetermined value (or when it is determined that the target advance amount changes relatively sharply), there is needed to change the actual advance amount highly responsively in accordance with the relatively sharp change of the target advance amount. Thus, control proceeds to step S103, where the change speed of the actual advance amount is detected. At this time, firstly, the actual advance amount for a predetermined time period is detected, and then, the change speed of the actual advance amount may be computed by dividing the detected actual advance amount by the predetermined time period, for example.

After the change speed of the actual advance amount is detected, control proceeds to step S104, where the change direction of the actual advance amount is identified depending on whether the change speed of the actual advance amount is less than a predetermined value "0" (or whether the change speed of the actual advance amount is a negative value or a positive value). More specifically, it is determined at step S104 whether the actual advance amount changes in the away direction such that the difference between the target advance amount and the actual advance amount becomes greater. When the difference between the target advance amount and the actual advance amount becomes greater, it is highly likely that the hold duty value has deviated from the appropriate value. Thus, when it is determined at S104 that the change speed of the actual advance amount is less than the predetermined value "0", the learning execution condition is satisfied in order to learn and correct the hold duty value. Then, control proceeds to step S105, where the learning operation for learning the hold duty value is executed. In the learning operation, a previous hold duty value is corrected based on the feed-back correction amount ("correction amount"), which is computed based on the deviation between the target advance amount and the actual advance amount, such that the corrected hold duty value is set as a new learned value for the hold duty value. In the above, the previous hold duty value corresponds to a hold duty value that is set before the execution of the present program. The above learning operation is described in a different manner, For example, the sum of the corrected hold duty value (A) and the feed-back correction amount (B) during the learning operation is computed as a present control duty value (A+B), and the computed present control duty value (A+B) is learned as the new hold duty value. As above, the hold duty value is learned.

It should be noted that alternatively to the above determination at step S104, it may be determined at step S104 whether the change speed of the actual advance amount has been equal to or less than a predetermined value for a predetermined time period. When it is determined that the change speed has been equal to or less than the predetermined value for the predetermined time period, control proceeds to step S105.

When it is determined at step S104 that the change speed of the actual advance amount is equal to or greater than the predetermined value "0", it is identified that the actual advance amount changes in the direction such that the actual advance amount becomes closer to the target advance amount. Thus, control proceeds to step S106, where it is determined whether an elapsed time since a time of changing the target advance amount is greater than a predetermined time period. For example, the predetermined time period indicates a time period, which it takes for the actual advance amount to become the target advance amount. When it is determined at step S106 that the elapsed time since the time of changing the target advance amount is equal to or less than the predetermined time period, it is identified that the actual advance amount is still changing in the direction such that the actual advance amount becomes closer to the target advance amount. Thus, control returns to step S103.

In contrast, when it is determined at step S106 that the elapsed time since the time of changing the target advance amount exceeds the predetermined time period, it is determined that the hold duty value is set as the appropriate value and thereby the actual advance amount has reached the target advance amount. Thus, the program is ended.

It should be noted that when it is determined at step S106 that the elapsed time since the time of changing the target advance amount exceeds the predetermined time period, the hold duty value may be again learned and corrected in a manner similar to step S105.

In the present embodiment, it is determined whether the actual advance amount changes in the away direction such that the deviation between the target advance amount and the actual advance amount becomes greater. When it is determined that the actual advance amount changes in the away direction, the learning execution condition is satisfied, and thereby the hold duty value is learned. As a result, it is possible to learn the hold duty value before making sure that both the target advance amount and the actual advance amount have not substantially changed for the predetermined time period. Therefore, in a case, where the hold duty value has deviated from the appropriate value, it is possible to learn and correct the hold duty value at an earlier stage. Due to the above, it is possible to reduce a time period, during which the deviation between the target advance amount and the actual advance amount is kept substantially greater, and thereby it is possible to reduce the disadvantages, such as the insufficient torque or the deterioration in emission quality caused by the unwanted difference between the actual advance amount and the target advance amount.

It should be noted that in the present embodiment, it is determined whether the actual advance amount changes in the direction such that the difference between the target advance amount and the actual advance amount becomes greater. As shown in FIGS. 6A to 7D, when the hold duty value is set differently from the appropriate value, the actual advance amount changes in a manner such that the difference between the target advance amount and the actual advance amount becomes smaller and then becomes greater. Thus, the behavior of the change direction of the actual advance amount may be alternatively detected instead of detecting the direction of the change of actual advance amount. In the above alternative case, even when the hold duty value is out of the appropriate value, it is possible to learn and correct the hold duty value at the earlier stage advantageously. Also, it is possible to more accurately detect an abnormal state, where the hold control amount is wrongly or erroneously set.

Also, in FIGS. 6A to 7D, the embodiment has been described for a case, where the target advance amount is greater than the actual advance amount. However, the same is true to an alternative case, where the target advance amount is smaller than the actual advance amount. In the alternative case, if the hold duty value is out of the appropriate value, the difference between the target advance amount and the actual advance amount may become smaller and then become greater. More specifically, the change speed of the actual advance amount may change to a positive value from a negative value in the above alternative case. Thus, in the program described above, the hold duty value may be alternatively learned when the change speed of the actual advance amount is equal to or greater than the predetermined value "0".

It should be noted that in the present embodiment, the change speed of the actual advance amount in the positive value indicates that the actual advance amount further changes in the advance direction such that the camshaft phase is further advanced. The change speed of the actual advance amount in the negative value indicates that the actual advance amount further changes in the retard direction such that the camshaft phase is further retarded. Also, the expression of that the target advance amount is greater than the actual advance amount means that the target advance amount is set on an advance side of the actual advance amount. Also, the expression of that the target advance amount is smaller than the actual advance amount means that the target advance amount is set on a retard side of the actual advance amount.

In the present embodiment, in order to execute the learning operation of the hold duty value based on the change direction of the actual advance amount, the change direction of the actual advance amount is identified or determined based on whether the change speed of the actual advance amount is the positive value or the negative value. However, the change direction of the actual advance amount may be alternatively identified based on a trajectory of the change the actual advance amount with time. In other words, a time-varied actual advance amount is monitored to trace the change of the actual advance amount with time, and then, the change direction of the actual advance amount may be determined based on the trajectory of the change of the monitored actual advance amount.

Also, the above embodiment was described by using an example of the feed-back control in a proportional-and-derivative (PD) control. However, the present invention is applicable to a feedback control in a proportional-integral-derivative (PID) control. For example, when the actual advance amount is a certain value different from the target advance amount in the PID control, the actual advance amount does not stay at the certain value. However, the actual advance amount is feed-back controlled to gradually change to the target advance amount due to an integral gain in the PID control. Thus, in the feed-back control in the PID control, it is determined that the operation is stable when the change speed of the actual advance amount relative to the target advance amount is equal to or smaller than a predetermined value.

It should be noted that in the present embodiment, the present invention is applied to an intake-side variable valve timing control. However, the present invention is also applicable to an exhaust-side variable valve timing control that controls valve timing of an exhaust valve.

Additional advantages and modifications will readily occur to those skilled in the art. The invention in its broader terms is therefore not limited to the specific details, representative apparatus, and illustrative examples shown and described.

What is claimed is:

1. A valve timing control apparatus for an internal combustion engine comprising:
   a variable valve timing mechanism that changes valve timing of at least one of an intake valve and an exhaust valve of the internal combustion engine, the variable valve timing mechanism being driven based on oil pressure;
   oil pressure control means for controlling the oil pressure that drives the variable valve timing mechanism;
   target valve timing setting means for setting target valve timing based on an operational state of the internal combustion engine;
   actual valve timing detection means for detecting actual valve timing;
   control amount computing means for computing a control amount used for controlling the oil pressure control means, the control amount computing means computing the control amount based on (a) a deviation, which is defined between the target valve timing and the actual valve timing, and based on (b) a hold control amount, which is used for maintaining the actual valve timing at a present state, wherein the oil pressure control means controls the oil pressure based on the control amount computed by the control amount computing means such that the actual valve timing becomes the target valve timing; and
   learning means for executing a learning operation for learning the hold control amount, wherein:
   the learning means determines whether a learning execution condition for executing the learning operation is satisfied based on a change direction of the actual valve timing detected by the actual valve timing detection means; and
   the learning means executes the learning operation for learning the hold control amount when the learning means determines that the learning execution condition is satisfied.

2. The valve timing control apparatus according to claim 1, wherein:
   the learning means determines whether the actual valve timing changes in an away direction such that a deviation between the target valve timing and the actual valve timing becomes greater; and
   the learning means determines that the learning execution condition is satisfied when the actual valve timing changes in the away direction.

3. The valve timing control apparatus according to claim 1, wherein:
   the learning means determines whether the actual valve timing changes in a certain manner such that a deviation between the target valve timing and the actual valve timing becomes smaller and then becomes greater; and
   the learning means determines that the learning execution condition is satisfied when the actual valve timing changes in the certain manner.

4. The valve timing control apparatus according to claim 1, wherein:
   the learning execution condition at least includes that the actual valve timing changes.

5. The valve timing control apparatus according to claim 1, wherein:

the learning means identifies the change direction of the actual valve timing based on whether a change speed of the actual valve timing detected by the actual valve timing detection means is a positive value or a negative value.

6. The valve timing control apparatus according to claim 1, wherein:

the learning means learns the hold control amount by correcting the hold control amount by using a correction amount that is computed based on the deviation between the target valve timing and the actual valve timing.

* * * * *